United States Patent
Lu et al.

(10) Patent No.: US 9,343,070 B2
(45) Date of Patent: May 17, 2016

(54) SOUND TRANSMISSION-BASED VERIFICATION METHOD

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 0 days.

(21) Appl. No.: 14/390,068

(22) PCT Filed: Aug. 30, 2013

(86) PCT No.: PCT/CN2013/082723
§ 371 (c)(1),
(2) Date: Oct. 2, 2014

(87) PCT Pub. No.: WO2014/036913
PCT Pub. Date: Mar. 13, 2014

(65) Prior Publication Data
US 2015/0325242 A1  Nov. 12, 2015

(30) Foreign Application Priority Data

Sep. 4, 2012  (CN) .......................... 2012 1 0323438

(51) Int. Cl.
*G10L 17/00* (2013.01)
*G10L 17/24* (2013.01)
*H04L 29/06* (2006.01)

(52) U.S. Cl.
CPC ................ *G10L 17/24* (2013.01); *H04L 63/08* (2013.01); *H04L 63/18* (2013.01)

(58) Field of Classification Search
CPC ....... G06Q 20/02; G06Q 20/10; G06Q 20/32; G06Q 20/40145; G11B 20/00086
USPC .......... 704/246; 713/179, 172, 176, 183, 189; 726/4, 5, 6, 7; 235/380
See application file for complete search history.

(56) References Cited

U.S. PATENT DOCUMENTS 8,862,888 B2 *  10/2014  Tolba et al. ................... 713/179
2012/0078639 A1   3/2012  Kumar
2013/0124416 A1 *  5/2013  Pawar et al. .................... 705/44

* cited by examiner

*Primary Examiner* — Charlotte M Baker
(74) *Attorney, Agent, or Firm* — Hammer & Associates, P.C.

(57) ABSTRACT

A sound transmission-based verification method comprises: a client receiving a data packet set generated by a server according to request information, and converting the data packet set into audio data and play the audio data; a dynamic password apparatus collecting the audio data played by the client, decoding the audio data to obtain data information, and when the information is integral, generating and outputting display information; after the client receives a dynamic password, the client sending the dynamic password to the server; and the server generating, according to the request information, a verifying dynamic password to verify whether the dynamic password is valid, and if the dynamic password is valid, performing an operation according to the request information.

36 Claims, 6 Drawing Sheets

SOUND TRANSMISSION-BASED VERIFICATION METHOD

TECHNICAL FIELD

The present invention relates to information security field, and particularly relates to an authentication method based on a voice transfer.

PRIOR ART

OTP (abbreviation of One-time Password), also named as a dynamic password, is an unpredictable random number combination generated by a dynamic token with specific algorithm every specific time. Each OTP can be used for only one time. When being authenticated, besides an account number and a static password, a user must input an OTP. Only passing a systematic authentication, can the user log on or transact normally, which ensures validity and uniqueness of the user's identity. A distinct advantage of the dynamic token is that the password used each time by a user is different, which prevents valid user identity from being faked by a misfeasor. The OTP authentication technology is thought as one of most efficient methods for authenticating an identity of a user, and it can eliminate networking problems such as a hacker or Trojan stealing an account number or a password of a user, or faked website. These networking problems result in loss in asset or information of a user. Currently, the dynamic token is widely used in fields such as E-banking, E-game, telecommunication operator, electronic government and enterprises.

Comparing with a traditional dynamic token, the dynamic token for generating a OTP with user information has higher security. The dynamic token receives user information before generating a OTP. At the present, the dynamic token of generating OTP with user information has a keyboard with itself, and the user information is input by a user through the keyboard in the dynamic token.

In implementing the invention, the inventors find that, in case of inputting a plurality of user information, inputting user information manually has low speed and high error rate. Moreover, because error input is not easy to be found and modified, and user time is wasted and unnecessary trouble may come with.

SUMMARY OF THE INVENTION

The object of the present invention is to provide a voice transfer based authentication method which solves a problem of possible authentication result error, long time and human resource cost resulted by manually inputting authentication data when using an authentication method with OTP in the prior art, and therefore reduces cost and improves authentication security.

Thus, according to one aspect of the present invention, there is provided a voice transfer based authentication method, comprising:

Step A, a client side sending a request information message to a server upon receiving request information;

Step B, the server extracting and storing the request information in the request information message, generating a data packet group according to the request information, and returning the data packet group to the client side;

Step C, the client side converting the data packet into audio data, repeatedly broadcasting the audio data, and waiting for receiving a OTP (one time password);

Step D, a OTP device collecting the audio data broadcasted by the client side, encoding the audio data, so as to obtain data information, determining whether the data information is complete, if yes, generating displaying information and outputting the displaying information, if confirmation information is received within a preset time, generating a OTP according to the data information and outputting the OTP; otherwise, outputting information of prompting incomplete data information;

Step E, the client side sending the OTP to the server upon receiving the OTP;

Step F, the server generating an authentication OTP according to the request information upon receiving the OTP, and authenticating whether the OTP is valid according to the authentication OTP, if yes, the server executing an operation according to the request information; otherwise, the server sending information of prompting invalid OTP to the client side; and Step G, the client side outputting corresponding prompting information upon receiving the information of prompting invalid OTP.

Preferably, Step B and Step C are replaced with

Step B', the server extracting and storing the request information in the request information message, generating a data packet group according to the request information, and converting the data packet group into audio data and returning the audio data to the client side;

Step C', the client side repeatedly broadcasting the audio data upon receiving the audio data and waiting for receiving the OTP.

Preferably, the converting the data packet group into audio data and repeatedly broadcasting the audio data comprises Step 1) converting the data packet group into a binary array;

Step 2) checking for a current bit of the binary array, if the current bit of the binary array is 1, storing a first preset array into a data buffer; if the current bit of the binary array is 0, storing a second preset array into the data buffer; and Step 3) determining whether the current bit is a final bit of the binary array, if yes, the encoding being completed and repeatedly outputting data in the data buffer according to a preset sampling frequency and a sampling size; and otherwise, taking the next bit as the current bit and returning to Step 2).

Preferably, the converting the data packet group into audio data and repeatedly broadcasting the audio data comprises Step 1) converting the data packet group into a binary array;

Step 2) checking for a current bit of the binary array, if the current bit of the binary array is 1, storing a first preset array into the data buffer; and if the current bit of the binary array is 0, storing a second preset array into the data buffer; and Step 3) determining whether the current bit is a final bit of the binary array, if yes, the encoding being completed, and repeatedly outputting data in the data buffer according a preset sampling frequency and a sampling size; and otherwise, taking the next bit as the current bit and returning to Step 2).

Preferably, the converting the data packet group into audio data and repeatedly broadcasting the audio data comprises:

Step 1) converting the data packet group into a binary array;

Step 2) checking for a current bit of the binary array, if the current bit of the binary array is 1, computing according to first preset algorithm, a first preset data and a first preset amplitude, and storing the computing result into a data buffer subsequently; if the current bit of the binary array is 0, computing according to a first preset algorithm, a second preset data and the first preset amplitude, and storing the computing result into the data buffer subsequently; and Step 3) determining whether the current bit is a final bit of the binary array, if yes, the encoding being completed, and repeatedly outputting data in the data buffer according to a preset sampling frequency and a preset sampling size; otherwise, taking the next bit as the current bit and returning to Step 2).

Preferably, the converting the data packet group into audio data and repeatedly broadcasting the audio data comprises:

Step 1) converting the data packet into a binary array; Step 2) checking for a current bit of the binary array, if the current bit of the binary array is 1, computing according to a first preset algorithm, a first preset data and a first preset amplitude and storing the computing result into a data buffer one by one; and if the current bit of the binary array is 0, computing according to a first preset algorithm, a second preset data and the first preset amplitude and storing the computing result into the data buffer subsequently;

Step 3) determining whether the current bit is a final bit of the binary array, if yes, the encoding being completed, and repeatedly outputting data in the data buffer according to a preset sampling frequency and a preset sampling size; otherwise, taking the next bit as the current bit and returning to Step 2).

Preferably, the computing according to first preset algorithm, a first preset data and a first preset amplitude and storing the computing result into a data buffer subsequently comprises:

Step 1) computing a result of dividing $2\pi$ by the first preset data, assigning the computing result to a first variable, assigning a third preset data to a second variable;

Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and Step 3) determining whether a value of the second variable is smaller than the first preset data, if the value of the second variable is smaller than the first preset data, returning to Step 2); if the value of the second variable is not smaller than the first preset data, the computing being completed; while the computing according to a first preset algorithm, a second preset data and the first preset amplitude and storing the computing result into the data buffer subsequently comprises:

Step 1) computing a result of dividing $2\pi$ by the second preset data, assigning the computing result to a first variable, assigning the third preset data to a second variable;

Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and Step 3) determining whether a value of the second variable is smaller than the second preset data, if yes, returning to Step 2); otherwise, the computing being completed.

Preferably, the computing according to a first preset algorithm, a first preset data and a first preset amplitude and storing the computing result into a data buffer subsequently comprises:

Step 1) computing a result of dividing $2\pi$ by first preset data, assigning the computing result to a first variable, assigning a third preset data to a second variable;

Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and Step 3) determining whether a value of the second variable is smaller than the first preset data, if the value of the second variable is smaller than the first preset data, returning to Step 2); if the value of the second variable is not smaller than the first preset data, the computing being completed; while the computing according to a first preset algorithm, a second preset data and a first preset amplitude and storing the computing result into the data buffer subsequently comprises Step 1) computing a result of dividing $2\pi$ by the second preset data, assigning the computing result to a first variable, assigning a third preset data to a second variable;

Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and Step 3) determining whether a value of the second variable is smaller than the second preset data, if yes, returning to Step 2); otherwise, the computing being completed.

Preferably, the converting the data packet into audio data and repeatedly broadcasting the audio data comprises:

Step 1) converting the data packet into a binary array;

Step 2) checking for a current bit of the binary array, if the current bit of the binary array is 1, computing according to a second preset algorithm, a fourth preset data and a second preset amplitude and storing the computing result in a data buffer subsequently; if the current bit of the binary array is 0, computing according to the second preset algorithm, the fourth preset data and a third preset amplitude and storing the computing result in the data buffer subsequently; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

Preferably, the converting the data packet into audio data and repeatedly broadcasting the audio data comprises:

Step 1) converting the data packet into a binary array;

Step 2) checking for a current bit of the binary array, if the current bit of the binary array is 1, computing according to a second preset algorithm, a fourth preset data and a second preset amplitude and storing the computing result into a data buffer subsequently; while if the current bit of the binary array is 0, computing according to the second preset algorithm, the fourth preset data and a third preset amplitude, and storing the computing result into a data buffer subsequently; and Step 3) determining whether the current bit is a final bit in the binary array, if yes, the encoding being completed, and repeatedly broadcasting data in the data buffer according to a preset sampling frequency and a preset sampling size; otherwise, taking the next bit as the current bit and returning to Step 2).

Preferably, the computing according to a second preset algorithm, a fourth preset data and a second preset amplitude and storing the computing result in the data buffer subsequently comprises:

Step 1) computing a result of dividing $2\pi$ by the fourth preset data, assigning the computing result to a first variable;

Step 2) assigning a third preset data to a second variable;

Step 3) computing a product of the first variable and the second variable, assigning the computing result to a third variable, computing a sine value of the third variable and assigning the computing result to a fourth variable; computing a product of the fourth variable and the second preset amplitude and assigning the computing result to a fifth variable, wherein a current value of the fifth variable is stored in the data buffer, and a value of the second variable is increased progressively;

Step 4) determining whether a value of the second variable is smaller than the fourth preset data, if yes, returning to Step 3); otherwise, the computing being completed; while the computing according to the second preset algorithm, the fourth preset data and a third preset amplitude and storing the computing result in the data buffer subsequently comprises:

Step 1) computing a result of dividing $2\pi$ by the fourth preset data and assigning the computing result to a first variable;

Step 2) assigning the third preset data to a second variable;

Step 3) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and Step 4) determining whether a value of the second variable is smaller than the fourth preset data, if yes, returning to Step 3); otherwise, the computing being completed.

Preferably, the computing according to a second preset algorithm, a fourth preset data and a second preset amplitude and storing the computing result in the data buffer subsequently comprises:

Step 1) computing a result of dividing $2\pi$ by the fourth preset data and assigning the computing result to a first variable;

Step 2) assigning the third preset data to a second variable;

Step 3) computing a product of the first variable and the second variable, assigning the computing result to a third variable, computing a sine value of the third variable and assigning the computing result to a fourth variable; computing a product of the fourth variable and the second preset amplitude and assigning the computing result to a fifth variable, wherein a current value of the fifth variable is stored in the data buffer, and a value of the second variable is increased progressively; and Step 4) determining whether a value of the second variable is smaller than the fourth preset data, if yes, returning to Step 3); otherwise, the computing being completed; while the computing according to the second preset algorithm, the fourth preset data and a third preset amplitude and storing the computing result in the data buffer subsequently comprises:

Step 1) computing a result of dividing $2\pi$ by the fourth preset data and assigning the computing result to a first variable;

Step 2) assigning the third preset data to a second variable;

Step 3) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and Step 4) determining whether a value of the second variable is smaller than the fourth preset data, if yes, returning to Step 3); otherwise, the computing being completed.

Preferably, the converting the data packet into audio data and repeatedly broadcasting the audio data comprises:

Step 1) converting the data packet into a binary array;

Step 2) checking for a current bit of the binary array, if the current bit of the binary array is 1, computing according to a third preset algorithm, a fifth preset data and a fourth preset amplitude and storing the computing result into a data buffer subsequently; and if the current bit of the binary array is 0, computing according to the fourth preset algorithm, the fifth preset data and a fourth preset amplitude, and storing the computing result into the data buffer subsequently; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

Preferably, wherein the converting the data packet into audio data and repeatedly broadcasting the audio data comprises:

Step 1) converting the data packet into a binary array;

Step 2) checking for a current bit of the binary array, if the current bit of the binary array is 1, computing according to a third preset algorithm, a fifth preset data and a fourth preset amplitude, and storing the computing result into a data buffer subsequently; and if the current bit of the binary array is 0, computing according to the fourth preset algorithm, the fifth preset data and a fourth preset amplitude, and storing the computing result into a data buffer subsequently; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

Preferably, the computing according to a third preset algorithm, a fifth preset data and a fourth preset amplitude and storing the computing result into a data buffer subsequently comprises:

Step 1) computing a result of dividing $2\pi$ by the fifth preset data, assigning the computing result to a first variable;

Step 2) assigning a third preset data to a second variable;

Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes, returning to Step 3); otherwise, the computing being completed; while the computing according to the fourth preset algorithm, the fifth preset data and a fourth preset amplitude and storing the computing result into a data buffer subsequently comprises:

Step 1) computing a result of dividing $2\pi$ by the fifth preset data, assigning the computing result to a first variable;

Step 2) assigning a third preset data to a second variable;

Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes, returning to Step 3); otherwise, the computing being completed.

Preferably, the computing according to a third preset algorithm, a fifth preset data and a fourth preset amplitude and storing the computing result in a data buffer subsequently comprises:

Step 1) computing a result of dividing $2\pi$ by the fifth preset data and assigning the computing result to a first variable;

Step 2) assigning the third preset data to a second variable;

Step 3) computing a product of the first variable and the second variable, assigning the computing result to a third variable, computing a cosine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes data, returning to Step 3); otherwise, the computing being completed; while the computing according to the fourth preset algorithm, the fifth preset data and a fourth preset amplitude and storing the computing result into a data buffer subsequently comprises:

Step 1) computing a result of dividing $2\pi$ by the fifth preset data and assigning the computing result to a first variable;

Step 2) assigning third preset data to a second variable;

Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes, returning to Step 3); otherwise, the computing being completed.

Preferably, the OTP device generating a OTP according to the data information comprises that:

the OTP device generates the OTP with built-in algorithm according to the data information and a pre-stored seed; or the OTP device performs encryption operation with built-in algorithm according to the data information, a current dynamic factor and a pre-stored seed, so as to generate the OTP; wherein the dynamic factor comprises a time factor or an event factor.

Preferably, the OTP device generating a OTP according to the data information comprises that:

the OTP device generates the OTP with built-in algorithm according to the data information and a pre-stored seed; or the OTP device performs encryption operation with built-in algorithm according to the data information, a current dynamic factor and a pre-stored seed, so as to generate the OTP; wherein the dynamic factor comprises a time factor or an event factor.

Preferably, the server generating an authentication OTP with the request information comprises that:

the server generates the authentication OTP with a built-in algorithm according to the request information and a pre-stored seed; or the server performs encryption operation with a built-in algorithm according to the request information, a current dynamic factor and a pre-stored seed, so as to generate the authentication OTP; wherein the dynamic factor is a time factor or an event factor.

Preferably, the server generating an authentication OTP with the request information comprises that:

the server generates the authentication OTP with a built-in algorithm according to the request information and a pre-stored seed; or the server performs encryption operation with a built-in algorithm according to the request information, a current dynamic factor and a pre-stored seed, so as to generate the authentication OTP; wherein the dynamic factor is a time factor or an event factor.

Preferably, the authentication OTP is one OTP or a group of OTPs.

Preferably, the authentication OTP is one OTP or a group of OTPs.

Preferably, the server authenticating whether the OTP is valid according to the authentication OTP comprises:

if the authentication OTP is one OTP, determining whether the OTP is identical to the authentication OTP, if yes, the OTP being valid; otherwise, the OTP being not valid; while if the authentication OTP is a group of OTPs, determining whether any of the authentication OTPs is identical to the OTP, if yes, the OTP being valid; otherwise, the OTP being not valid.

Preferably, the server authenticating whether the OTP is valid according to the authentication OTP comprises:

if the authentication OTP is one OTP, determining whether the OTP is identical to the authentication OTP, if yes, the OTP being valid; otherwise, the OTP being not valid; while if the authentication OTP is one group of OTPs, determining whether any of the authentication OTPs is identical to the OTP, if yes, the OTP being valid; otherwise, the OTP being not valid.

According to another aspect of the present invention, there is provided voice transfer based authentication method, comprising:

Step a) a client side storing request information upon receiving the request information, generating a data packet group according to the request information, converting the data packet group into audio data and repeatedly broadcasting the audio data and waiting for receiving a OTP (one time password);

Step b) a OTP device collecting the audio data broadcasted by the client side, encoding the audio data to obtain data information, determining whether the data information is complete, if yes, generating displaying information and outputting the displaying information, and if confirmation information is received within a preset time, generating a OTP according to the data information and outputting the OTP; otherwise, outputting information of prompting incomplete information;

Step c) the client side sending the OTP and the request information to the server upon receiving the OTP;

Step d) the server generating an authentication OTP according to the request information upon receiving the OTP and the request information, and authenticating whether the OTP is valid according to the authentication OTP, if yes, the server executing an operation according to the request information; otherwise, sending information of prompting an invalid OTP to the client side; and Step e) the client side outputting corresponding prompting information upon receiving the information of prompting the invalid OTP.

Preferably, the converting the data packet group into audio data and repeatedly broadcasting the audio data comprises:

Step 1) converting the data packet group into a binary array;

Step 2) checking for a current bit of the binary array, if the current bit of the binary array is 1, storing a first preset array in a data buffer; and if the current bit of the binary array is 0, storing a second preset array in the data buffer; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

Preferably, the converting the data packet group into audio data and repeatedly broadcasting the audio data comprises:

Step 1) converting the data packet group into a binary array;

Step 2) checking for a current bit of the binary array, if the current bit of the binary array is 1, computing according to a first preset algorithm, a first preset data and a first preset amplitude and storing the computing result into a data buffer subsequently; while if the current bit of the binary array is 0, computing according to a first preset algorithm, a second preset data and the first preset amplitude and storing the computing result into the data buffer subsequently; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

Preferably, the computing according to a first preset algorithm, a first preset data and a first preset amplitude and storing the computing result into a data buffer subsequently comprises:

Step 1) computing a result of dividing $2\pi$ by the first preset data, assigning the computing result to a first variable, assigning a third preset data to a second variable;

Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively;

Step 3) determining whether a value of the second variable is smaller than the first preset data, if yes, going to Step 2); otherwise, the computing being completed; while The computing according to a first preset algorithm, a second preset data and a first preset amplitude and storing the computing result into a data buffer subsequently comprises:

Step 1) computing a result of dividing $2\pi$ by the second preset data, assigning the computing result to a first variable, assigning a third preset data to a second variable;

Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in a data buffer, and a value of the second variable is increased progressively; and Step 3) determining whether a value of the second variable is smaller than the second preset data, if yes, going to Step 2); otherwise, the computing being completed.

Preferably, the converting the data packet group into audio data and repeatedly broadcasting the audio data comprises:

Step 1) converting the data packet group into a binary array;

Step 2) checking for a current bit of the binary array, if the current bit of the binary array is 1, computing according to a second preset algorithm, a fourth preset data and a second preset amplitude and storing the computing result into a data buffer subsequently; while if the current bit of the binary array is 0, computing according to a second preset algorithm, a fourth preset data and a third preset amplitude and storing the computing result into the data buffer subsequently; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

Preferably, the computing according to a second preset algorithm, a fourth preset data and a second preset amplitude and storing the computing result into a data buffer subsequently comprises:

Step 1) computing a result of dividing $2\pi$ by the fourth preset data, assigning the computing result to a first variable;

Step 2) assigning a third preset data to a second variable;

Step 3) computing a product of the first variable and the second variable, assigning the computing result to a third variable, computing a sine value of the third variable and assigning the computing result to a fourth variable; computing a product of the fourth variable and the second preset amplitude and assigning the computing result to a fifth variable, wherein a current value of the fifth variable is stored in the data buffer, and a value of the second variable is increased progressively; and Step 4) determining whether a value of the second variable is smaller than the fourth preset data; if yes, going to Step 3); otherwise, the computing being completed; while the computing according to a second preset algorithm, a fourth preset data and a third preset amplitude and storing the computing result in a data buffer comprises:

Step 1) computing a result of dividing 2π by the fourth preset data and assigning the computing result to a first variable;

Step 2) assigning a third preset data to a second variable;

Step 3) computing a product of the first variable and the second variable, assigning the computing result to a third variable, computing a sine value of the third variable and assigning the computing result to a fourth variable; computing a product of the fourth variable and the third preset amplitude and assigning the computing result to a fifth variable, wherein a current value of the fifth variable is stored in the data buffer, and a value of the second variable is increased progressively; and Step 4) determining whether a value of the second variable is smaller than the fourth preset data, if yes, returning to Step 3); otherwise, the computing being completed.

Preferably, the converting the data packet group into audio data and repeatedly broadcasting the audio data comprises:

Step 1) converting the data packet group into a binary array;

Step 2) checking for a current bit of the binary array, if the current bit of the binary array is 1, computing according to a third preset algorithm, a fifth preset data and a fourth preset amplitude and storing the computing result into a data buffer subsequently; while if the current bit of the binary array is 0, computing according to a fourth preset algorithm, a fifth preset data and a fourth preset amplitude and storing the computing result into the data buffer subsequently; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

Preferably, the computing according to a third preset algorithm, a fifth preset data and a fourth preset amplitude and storing the computing result into a data buffer subsequently comprises:

Step 1) computing a result of dividing 2π by the fifth preset data, assigning the computing result to a first variable;

Step 2) assigning the third preset data to a second variable;

Step 3) computing a product of the first variable and the second variable, assigning the computing result to a third variable, computing a cosine value of the third variable and assigning the computing result to a fourth variable; computing a product of the fourth variable and the fourth preset amplitude and assigning the computing result to a fifth variable, wherein a current value of the fifth variable is stored in a data buffer, and a value of the second variable is increased progressively; and Step 4) determining whether a value of the second variable is smaller than the fifth preset data, if yes, returning to Step 3); otherwise, ending iteration; while the computing according to a fourth preset algorithm, a fifth preset data and a fourth preset amplitude and storing the computing result into a data buffer subsequently comprises:

Step 1) computing a result of dividing a by the fifth preset data, assigning the computing result to a first variable;

Step 2) assigning the third preset data to a second variable;

Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and the value of the second variable is increased progressively; and Step 4) determining whether a value of the second variable is smaller than the fifth preset data; if yes, returning to Step 3); otherwise, the computing being completed.

Preferably, the OTP device generating an OTP according to the data information comprises that the OTP device generates the OTP with a built-in algorithm according to the data information and a pre-stored seed; or the OTP device performs encryption operation with a built-in algorithm according to the data information, a current dynamic factor and a pre-stored seed, so as to generate the OTP; wherein the dynamic factor is a time factor or an event factor.

Preferably, the server generating an authentication OTP according to the request information comprises that the server generates the authentication OTP with a built-in algorithm according to the request information and a pre-stored seed; or the server performs encryption operation with the built-in algorithm according to the request information, a current dynamic factor and a pre-stored seed, so as to generate the authentication OTP; wherein the dynamic factor is a time factor or an event factor.

Preferably, the authentication OTP is one OTP or a group of OTPs.

Preferably, the server authenticating whether the OTP is valid according to the authentication OTP comprises:

if the authentication OTP is one OTP, determining whether the OTP is identical to the authentication OTP, if yes, the OTP being valid; otherwise, the OTP being not valid; or if the authentication OTP is one group of OTPs, determining whether any of the authentication OTPs is identical to the OTP, if yes, the OTP being valid; otherwise, the OTP being not valid.

Advantage of the invention: the invention solves a problem of possible authentication result error, longtime and human resource cost resulted by manually inputting authentication data when using an authentication method with OTP in the prior art, and therefore reduces cost and improves authentication security.

DESCRIPTION OF THE ACCOMPANYING DRAWINGS OF THE INVENTION

For clarifying embodiments of the invention or solutions in the prior art, drawings in the embodiments or drawings in prior art will be described simply. Obviously, the below drawings just relate to some embodiments of the invention, and other drawings can be obtained by those skilled in the art without inventive effort.

DETAILED EMBODIMENTS OF THE INVENTION

The technical solutions of the embodiments of the invention are described in a clear and complete manner in conjunction with the accompanying drawings as below. Obviously, the described embodiments are only part of embodiments of the invention, not the whole embodiments. Based on the embodiments of the invention, other embodiments obtained by a person skilled in the art without inventive step should fall below the scope of protection of the disclosure.

Embodiment 1

Figure 1:
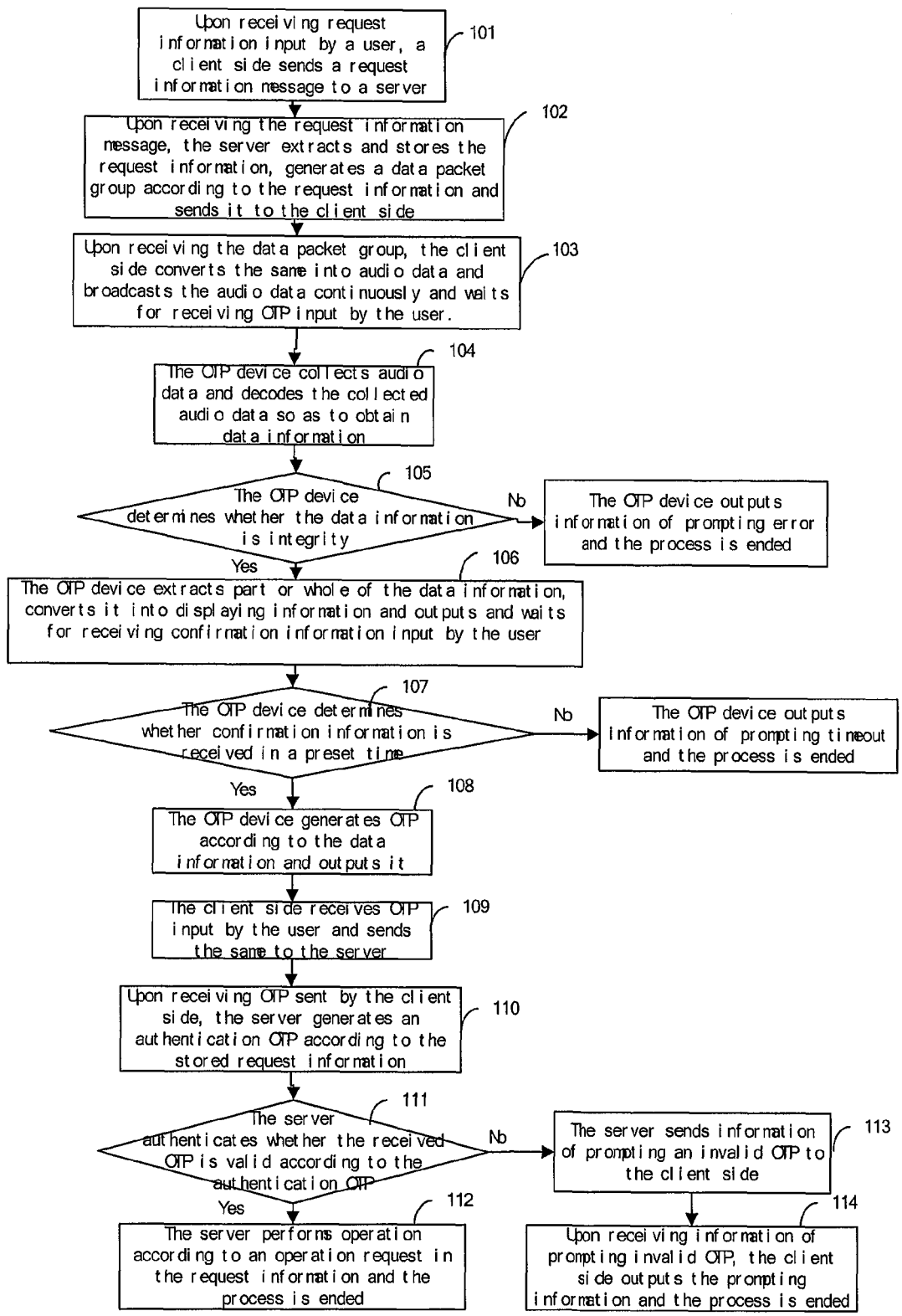
FIG. 1 is a flow chart of a voice transfer based authentication method provided in Embodiment 1 of the invention.

As illustrated in FIG. 1, a voice transfer based authentication method is provided in the embodiment 1. The method is implemented by a server, a client side and a OTP device, including steps as below.

Step 101, the client sends a request information message to the server after receiving request information input by a user.

Specifically, the request information includes a user identification code (ID), account number information, and amount. The request information is input by a user. The user ID is used to identify identity of a user and can be modified by the user.

The request information further includes information such as time, address, password and additional information. The additional information can be information comprised of a group of strings of arbitrary length input by the user.

For example, the request information message is <?xml version="1.0" encoding="UTF-8"?><T><D><M><k>User ID:</k><v>123456</v></M><M><k>Account number:</k><v>11112222<v><M><D><E><M><k>amount:</k><v>45600<v><M><E><T>.

Step 102, the server receives the request information message, extracts and stores the request information, generates a data packet group according to the request information, and sends the data packet group to the client side.

Preferably, in the embodiment 1, the generating a data packet group according to the request information includes adding preset data to the request information, grouping each item of information in the request information, and the preset data into a plurality of data packets and constructing the plurality of data packets into a data packet group.

Step 103, after receiving the data packet group sent by the server, the client side converts the data packet group into audio data, and repeatedly broadcasts the audio data and waits for receiving a OTP input by a user.

Specifically, converting the data packet group into audio data and outputting the data packet group includes converting the data packet into binary data, encoding each bit of the binary data, so as to obtain the audio data, and the client side revoking an operating system function to output the audio data via an audio broadcasting device according to a preset sampling frequency, a preset sampling size and a preset voice channel.

Specifically, in a Windows operating system, it needs to construct a WAVEFORMATEX structure; induct a sampling frequency 44100, a sampling size 16, a channel of single channel; invoke a waveOueOpen, induct the WAVEFORMATEX structure so as to obtain a HWAVEOUT handler; construct a WAVEHER structure; induct audio data; invoke waveOutPrepareHeader function; induct the WAVEHDR structure to prepare for broadcasting; invoke a waveOutWrite and induct the WAVEHDR for broadcasting.

Specifically, in an android operating system, it needs to construct an AudioTrack object, induct a sampling frequency 44100, a sampling size 16, a channel of single channel; invoke a write method of an AudioTrack class, write the audio data and invoke play method of an AudioTrack for broadcasting.

Specifically, in an IOS operating system, it needs to create an AQPlayer object, invoke a SendCmd function of the AQPlayer object, induct the audio data, invoke AudioQueueNewOutput by the SendCmd function, induct a sampling frequency 44100, a sampling size 16 and a channel of single channel, create a broadcasting queue and broadcast the AudioQueueStart for broadcasting by the SendCmd function.

Specifically, in a windows phone 7 operating system, it needs to create a SoundEffect object, induct the audio data, a sampling frequency 44100, sampling size 16 and a channel of single channel, invoke a CreateInstancefunction of the SoundEffect object, create a SoundEffectInstance object and create the Play function of the SoundEffectInstance for broadcasting.

Specifically, the method for converting the data packet group into audio data will be described in the embodiment 4, embodiment 5 and embodiment 6.

Step 104, the OTP device collects the audio data and decodes the collected audio data, so as to obtain data information.

Step 105, the OTP device determines whether the data information is integrate (or complete), if yes, Step 106 is executed; if no, the OTP device outputs information of prompting error and the process is ended.

Step 106, the OTP device extracts part or whole of the data information, converts the extracted part or whole of the data information into displaying information for user's checking, outputs the displaying information and waits for confirmation information input by the user.

Specifically, information extracted by the OTP device includes user ID, account number information, amount and additional information. The step includes converting the extracted information into a decimal value and taking the decimal value as the displaying information.

Step 107, the OTP device determines whether confirmation information is received in a preset time, if yes, Step 108 is executed; if no, the OTP device prompts timeout information and the process is ended.

For example, the preset time is 60 seconds.

Step 108, the OTP device generates a OTP according to the data information and outputs the OTP.

Method for generating a OTP by the OTP device can include computing and generating the OTP with a built-in algorithm according to the data information and a pre-stored seed, or generating the OTP by encrypting the data information, a current time factor (or an event factor) and a pre-stored seed with built-in algorithm.

Step 109, after receiving the OTP input by the user, the client side sends the OTP to the server.

Step 110, after receiving the OTP sent by the client side, the server generates an authentication OTP according the stored request information.

Specifically, the authentication OTP is one OTP or a group of OTPs.

Correspondingly, method for generating the authentication OTP by the server can include computing and generating the authentication OTP with a built-in algorithm according to the request information and the pre-stored seed, or generating the authentication OTP by encrypting the request information, the current time factor (or the event factor) and the pre-stored seed with a built-in algorithm.

Specifically, in the embodiment 1, the algorithm in the server and the seed pre-stored in the server are respectively same as the algorithm in the OTP device and the seed pre-stored in the OTP device.

Step 111, the server authenticates whether the OTP authenticated and received by the server is valid according to the authentication OTP, if yes, Step 112 is executed; if no, Step 113 is executed.

Specifically, in the embodiment 1, if the authentication OTP is one OTP and if the received OTP is the same as the authentication OTP, the received OTP is valid; if the received OTP is not the same as the authentication OTP, the received OTP is not valid.

If the authentication OTP is a group of OTPs and if any OTP in the authentication OTPs is the same as the received OTP, the received OTP is valid; if any OTP in the authentication OTPs is not the same as the received OTP, the received OTP is not valid.

Step 112, the server executes a corresponding operation according to an operation request in the request information and the process is ended.

Step 113, the server sends information of prompting an invalid OTP to the client side.

Step 114, after receiving the information of prompting an invalid OTP sent by the server, the client side outputs the information of prompting an invalid OTP, and the process is ended.

Embodiment 2

Figure 2:
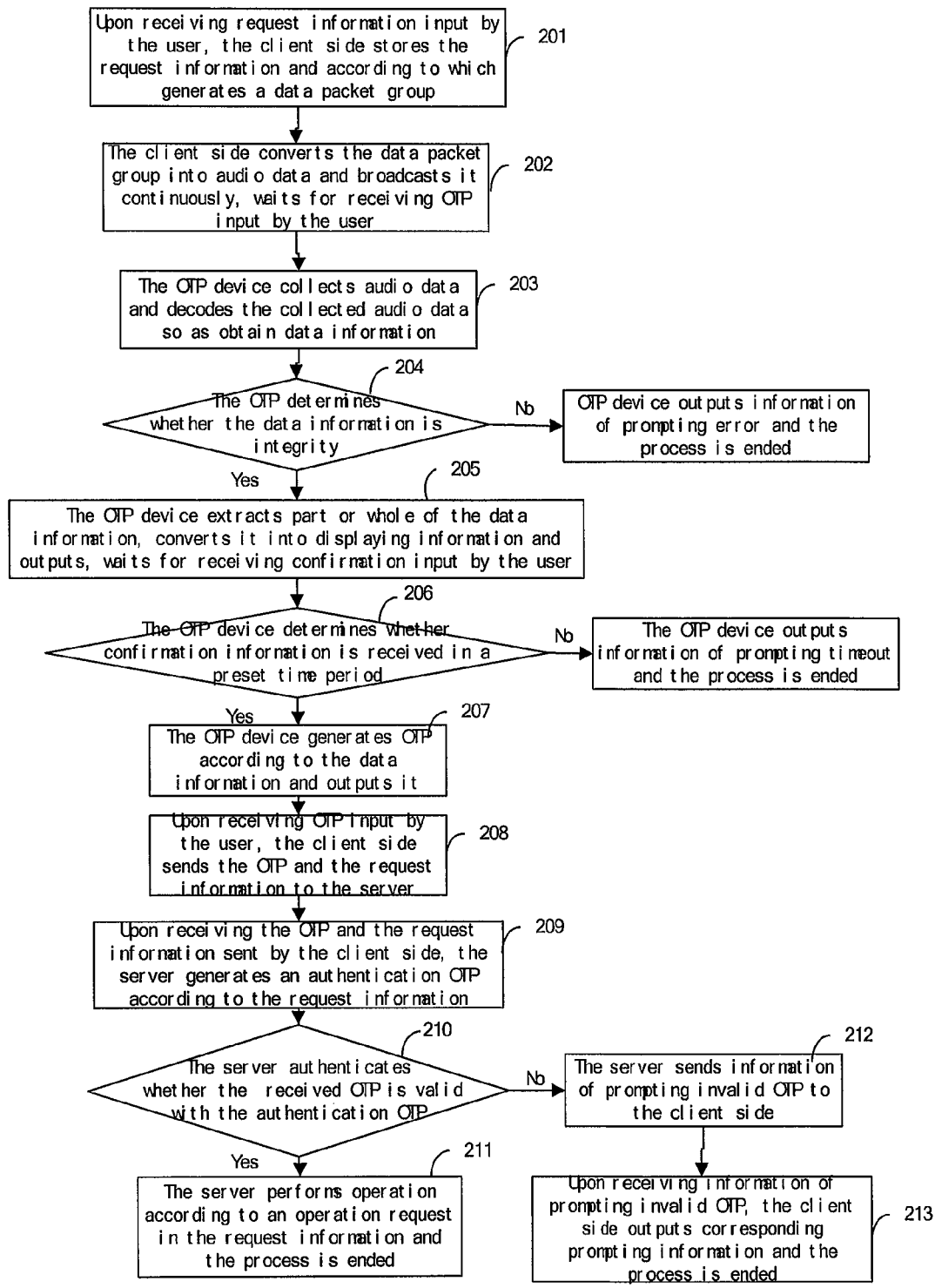
FIG. 2 is a flow chart of a voice transfer based authentication method provided in Embodiment 2 of the invention.

As illustrated in FIG. 2, a voice transfer based authentication method is provided in the embodiment 2. The method is implemented by a server, a client side and a OTP device, including steps as below.

Step 201, after receiving request information input by a user, the client side stores the request information and generates a data packet group according to the request information.

Specifically, the request information includes a user ID, account number information and amount. The request information is input by a user. The user ID can be used to identify identity of a user and can be modified by the user.

Further, the request information can include information such as time, address, password and additional information. The additional information can be information comprised of a group of strings of arbitrary length input by the user.

Preferably, in the embodiment 2, generating a data packet group according to the request information includes: adding preset data to the request information, grouping each item of information in the request information and the preset data into more data packets and grouping the data packets into a data packet group.

Step 202, the client side converts the data packet group into audio data, repeatedly broadcasts the audio data, and waits for receiving the OTP input by the user.

Preferably, the converting the data packet group into audio data and outputting the data packet group includes converting the data packet group into binary data, encoding each bit of the binary data, so as to obtain audio data, and the client side revoking an operating system function to output the audio data via a speaker according to a preset sampling frequency, a preset sampling size and a preset voice channel.

Specifically, the method for converting the data packet group into audio data will be described in Embodiment 4, Embodiment 5 and Embodiment 6.

Step 203, the OTP device collects audio data and decodes the collected audio data, so as to obtain data information.

Step 204, the OTP device determines whether the data information is complete, if yes, Step 205 is executed; if no, the OTP device outputs information of prompting error and ends a process.

Step 205, the OTP device extracts part or whole of the data information, converts the same into displaying information for user's check, outputs the displaying information, and waits for receiving confirmation information input by the user.

Preferably, in the embodiment 2, information extracted by the OTP device includes the user ID, the account number information, the amount and additional information. The extracted information is converted into a decimal value and the decimal value is taken as the displaying information.

Step 206, the OTP device determines whether the confirmation information is received within a preset time period, if yes, Step 207 is executed; if no, the OTP device outputs information of prompting timeout and the process is ended. For example, the preset time is 60 seconds.

Step 207, the OTP device generates a OTP according to the data information, and outputs the OTP.

Specifically, method for generating the OTP by the OTP device can include computing and generating the OTP with built-in algorithm according to the data information and a pre-stored seed, or generating the OTP by encrypting the data information, the current time factor (or the event factor) and the pre-stored seed with built-in algorithm.

Step 208, after receiving the OTP input by the user, the client side sends the OTP and the request information to the server.

Step 209, upon receiving the OTP and the request information sent by the client side, the server generates an authentication OTP according to the request information.

Specifically, the authentication OTP can be one OTP or a group of OTPs.

Correspondingly, method for generating the authentication OTP by the server can be computing and generating the authentication OTP with a built-in algorithm according to the request information and the pre-stored seed or generating the authentication OTP by encrypting the request information, a current time factor (or an event factor) and a pre-stored seed with built-in algorithm.

Specifically, in the embodiment 2, the algorithm in the server and the seed pre-stored in the server are respectively the same as the algorithm in the OTP device and the seed pre-stored in the OTP device.

Step 210, the server authenticates whether the received OTP is valid according to the authentication OTP, if yes, Step 211 is executed; if no, Step 212 is executed.

Specifically, in the embodiment 2, if the authentication OTP includes one OTP and if the received OTP is the same as the authentication OTP, the received OTP is valid; if the received OTP is not the same as the authentication OTP, the received OTP is not valid.

If the authentication OTP is a group of OTPs and if any OTP in the authentication OTPs is the same as the received OTP, the received OTP is valid; if any OTP in the authentication OTPs is not the same as the received OTP, the received OTP is not valid.

Step 211, the client server executes corresponding operation according to an operation request in the request information and the process is ended.

Step 212, the server sends information of prompting invalid OTP to the client side.

Step 213, after receiving the information of prompting invalid OTP sent by the server, the client side outputs the corresponding information of prompting invalid OTP, and the process is ended.

Embodiment 3

Figure 3:
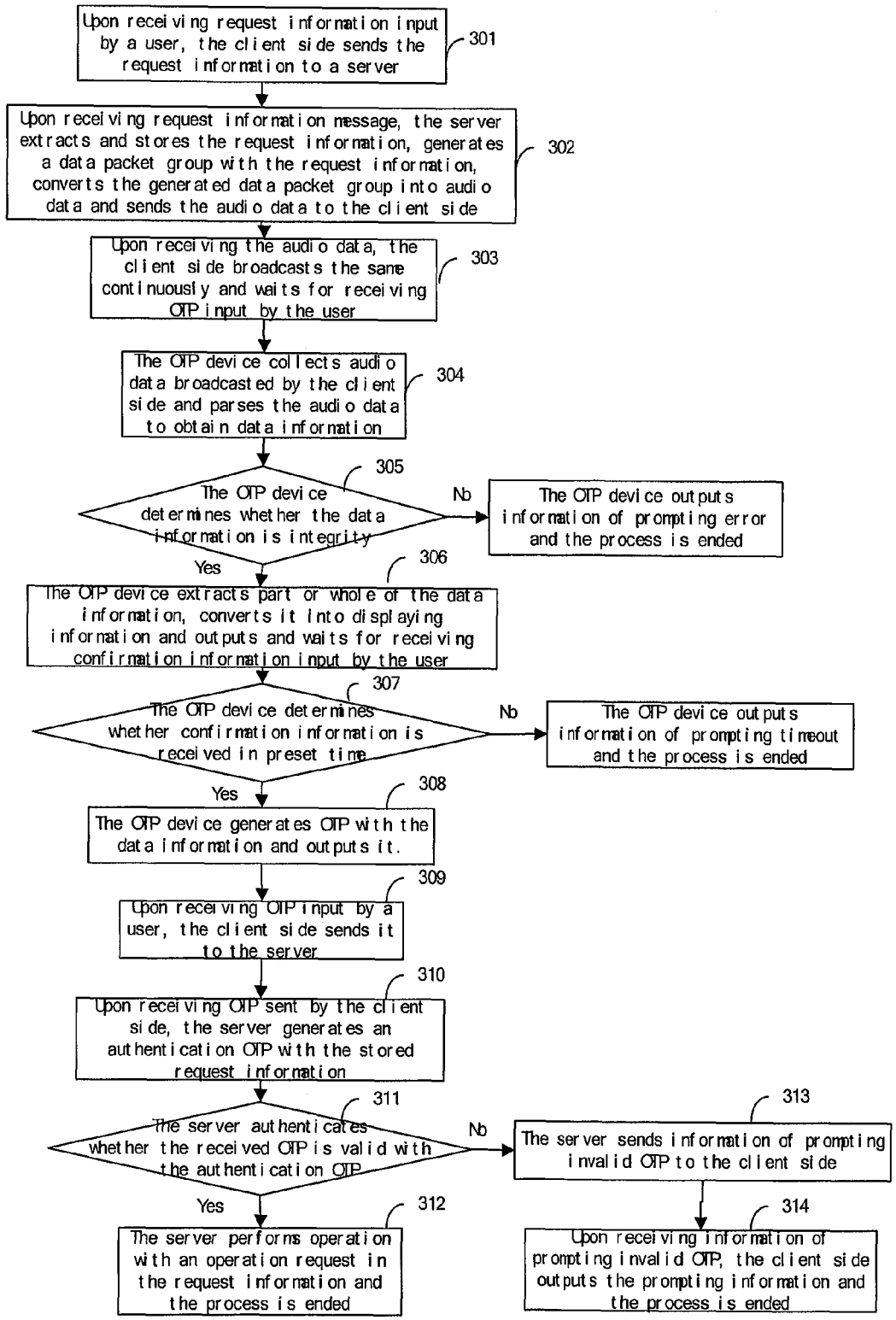
FIG. 3 is a flow chart of a voice transfer based authentication method provided in Embodiment 3 of the invention.

As illustrated in FIG. 3, a voice transfer based authentication method is provided by the embodiment 3. The method is implemented by a server, a client side and a OTP device, including steps as below.

Step 301, after receiving request information input by a user, the client side sends a request information message to the server.

Specifically, the request information includes a user ID, account number information and amount. The request information is input by a user. The user ID is used to identify identity of a user and can be modified by the user.

Further the request information can include information such as time, address, password and additional information. The additional information can be information comprised of a group of strings of arbitrary length input by the user.

Step 302, after receiving the request information, the server extracts and stores the request information, generates a data packet group according to the request information, converts the data packet group into audio data, and sends the audio data to the client side.

Preferably, in the embodiment 3, the generating a data packet group according to the request information includes adding preset data to the request information, grouping each item of information in the request information and the preset data into a plurality of data packets, and constructing the plurality of data packets into a data packet group.

Specifically, converting the data packet group into audio data and sending the data packet group to the client side includes converting the data packet into binary data, encoding each bit of the binary data so as to obtain the audio data, and sending the audio data to the client side.

The method for converting the data packet group into audio data and sending the data packet group will be described in Embodiment 4, Embodiment 5 and Embodiment 6.

Step 303, after receiving the audio data, the client side repeatedly broadcast the audio data and waits for receiving a OTP input by the user.

Specifically, the client side revokes an operating system function to output the audio data via an audio broadcasting device according to a preset sampling frequency, a preset sampling size and a preset voice channel.

Step 304, the OTP device collects audio data collected by the client side and decodes the collected audio data so as to obtain data information.

Step 305, the OTP device determines whether the data information is integrate/complete, if yes, Step 306 is executed; if no, the OTP device outputs information of prompting error and ends a process.

Step 306, the OTP device extracts part or whole of the data information, converts the part or whole of the data information into displaying information for user's checking, outputs the displaying information, and waits for receiving confirmation information input by the user.

Specifically, in the embodiment 3, the information extracted by the OTP device includes a user ID, account number information, amount and additional information. The above extracted information is converted into a decimal value and the decimal value is taken as the displaying information.

Step 307, the OTP device determines whether confirmation information is received in a preset time, if yes, Step 308 is executed; if no, the OTP device outputs information of prompting timeout and the process is ended.

For example, in the embodiment 3, the preset time is 60 seconds.

Step 308, the OTP device generates a OTP according to the data information and outputs the OTP.

Method for generating the OTP by the OTP device can be computing and generating the OTP with built-in algorithm according to the data information and a pre-stored seed, or generating the OTP by encrypting the data information, the current time factor (or the event factor) and the pre-stored seed with built-in algorithm.

Step 309, after receiving the OTP input by the user, the client side sends the OTP to the server.

Step 301, after receiving the OTP sent by the client side, the server generates an authentication OTP according to the stored request information.

Specifically, the authentication OTP is one OTP or a group of OTPs.

Method for generating the OTP by the server can be computing and generating the OTP with built-in algorithm according to the request information and a pre-stored seed or generating the OTP by encrypting the request information, a current time factor (or the event factor) and a pre-stored seed with built-in algorithm.

Specifically, in the embodiment 3, the algorithm in the server and the seed pre-stored in the server are the same as the algorithm in the OTP device and the seed pre-stored in the OTP device.

Step 311, the server authenticates whether the received OTP is valid according to the authentication OTP, if yes, Step 312 is executed; if no, Step 313 is executed.

Specifically, in the embodiment 3, if the authentication OTP is one OTP and if the received OTP is the same as the authentication OTP, the received OTP is valid; if the received OTP is not the same as the authentication OTP, the received OTP is not valid.

If the authentication OTP is a group of OTPs and if any OTP in the authentication OTPs is the same as the received OTP, the received OTP is valid; if any OTP in the authentication OTPs is not the same as the received OTP, the received OTP is not valid.

Step 312, the server performs corresponding operation according to an operation request in the request information, and the process is ended.

Step 313, the server sends information of prompting invalid OTP to the client side.

Step 314, after receiving the information of prompting invalid OTP sent by the server, the client side outputs the corresponding information of prompting invalid OTP, and the process is ended.

Embodiment 4

Figure 4:
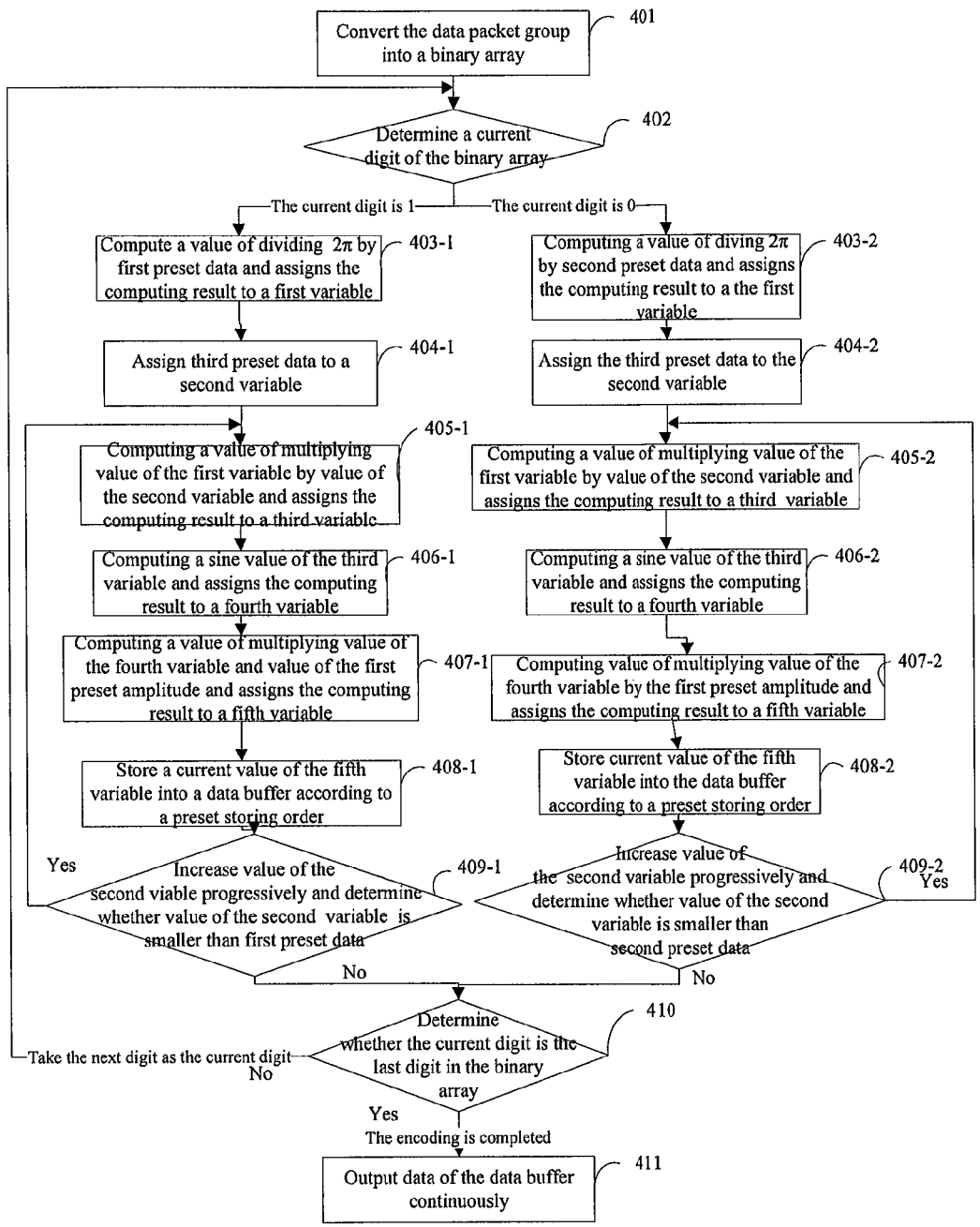
FIG. 4 is a flow chart of a method for converting a data packet group into audio data provided in Embodiment 4 of the invention.

As illustrated in FIG. 4, a method for converting the data packet group into audio data is provided in the embodiment 4. The method includes converting the data packet group into a binary array, checking for a current bit of the binary array, if the current bit of the binary array is 1, computing according to a first preset algorithm, a first preset data and a first preset amplitude, and stores the computing result into a data buffer subsequently; while if the current bit of the binary array is 0, computing according to the first preset algorithm, the first preset data and the first amplitude and storing the computing result into the data buffer subsequently; and determining whether the current bit of the binary array is a final bit of the binary array, if yes, the encoding being completed, and repeatedly outputting data in the data buffer; if no, taking the next bit as the current bit, returning to execute the above checking process, which includes steps as below.

Step 401, convert the data packet group into a binary array.

Specifically, in the embodiment 4, the data packet group is one byte of data 0x31, and therefore the binary array converted from the data packet group is 00110001.

Step 402, determine a current bit of the binary array, if the current bit of the binary array is 1, Step 403-1 is executed; if the current bit of the binary array is 0, Step 403-2 is executed.

Specifically, in the embodiment 4, all bits in the binary array are determined one by one.

Step 403-1, compute a result of dividing $2\pi$ by first preset data and assigns the computing result to a first variable.

Step 404-1, assign a third preset data to a second variable.

For example, in the embodiment 4, the preset data is 0.

Step 405-1, compute a product of the first variable and the second variable, and assign the computing result to a third variable.

Step 406-1, compute a sine value of the third variable and assign the computing result to a fourth variable.

Step 407-1, compute a product of the fourth variable and a first preset amplitude, and assign the computing result to a fifth variable. For example, the first preset amplitude can be 255 or 32767.

Step 408-1, store a current value of the fifth variable into a data buffer according to a preset storing order.

Specifically, the preset storing order is storing all values of the fifth variables subsequently, and assemble of values of the fifth variable corresponding to all bits in the binary array according to the preset order is the audio data.

Step 409-1, increase the second variable progressively and determine whether a value of the second variable is smaller than the first preset data, if yes, Step 405-1 is executed; if no, Step 410 is executed.

In the embodiment 4, the first preset data is 12; the first preset amplitude is 32767; value of the computed first variable is $\pi/6$; and after the above cycle from Step 405-1 to Step 409-1, the data stored in the data buffer is {0, 16383, 28377, 32767, 28377, 16383, 0, −16383, −28377, −32767, −28377, −16383}.

Step 403-2, compute a result of dividing $2\pi$ by second preset data and assign the computing result to the first variable.

Step 404-2, assign the third preset data to the second variable.

For example, the third preset data is 0.

Step 405-2, compute a product of the first variable and the second variable, and assign the computing result to the third variable.

Step 406-2, compute a sine value of the third variable, and assign the computing result to a fourth variable.

Step 407-2, compute a product of the fourth variable and the first preset amplitude, and assign the computing result to a fifth variable. For example, the first preset amplitude is 255 or 32767.

Step 408-2, store a current value of the fifth variable into the data buffer according to a preset storing order.

Specifically, the preset storing order is storing all values of the fifth variables subsequently and assemble of values of the fifth variable corresponding to all bits in the binary array according to the preset order is the audio data.

Step 409-2, increase value of the second variable progressively and determine whether value of the second variable is smaller than the second preset data, if yes, Step 405-2 is executed; if no, Step 410 is executed.

In the embodiment 4, the second preset data is 6; the first preset amplitude is 32767; value of the computed first variable is $\pi/3$; and after the above cycle from Step 405-1 to Step 409-1, the data stored in the data buffer is {0, 28377, 28377, 0, −28377, −28377}.

Step 410, determine whether the current bit is a final bit of the binary array, if yes, Step 411 is executed; if no, take the next bit as the current bit and return to Step 402.

Step 411, repeatedly output data in the buffer.

For example, the data packet group is one byte of data 0x31 and final data in the data buffer is as below.

{0, 28377, 28377, 0, −28377, −28377;
0, 28377, 28377, 0, −28377, −28377;
0, 16383, 28377, 32767, 28377, 16383, 0, −16383, −28377, −32767, −28377, −16383;
0, 16383, 28377, 32767, 28377, 16383, 0, −16383, −28377, −32767, −28377, −16383;
0, 28377, 28377, 0, −28377, −28377;
0, 28377, 28377, 0, −28377, −28377;
0, 28377, 28377, 0, −28377, −28377;
0, 16383, 28377, 32767, 28377, 16383, 0, −16383, −28377, −32767, −28377, −16383}.

Embodiment 5

Figure 5:
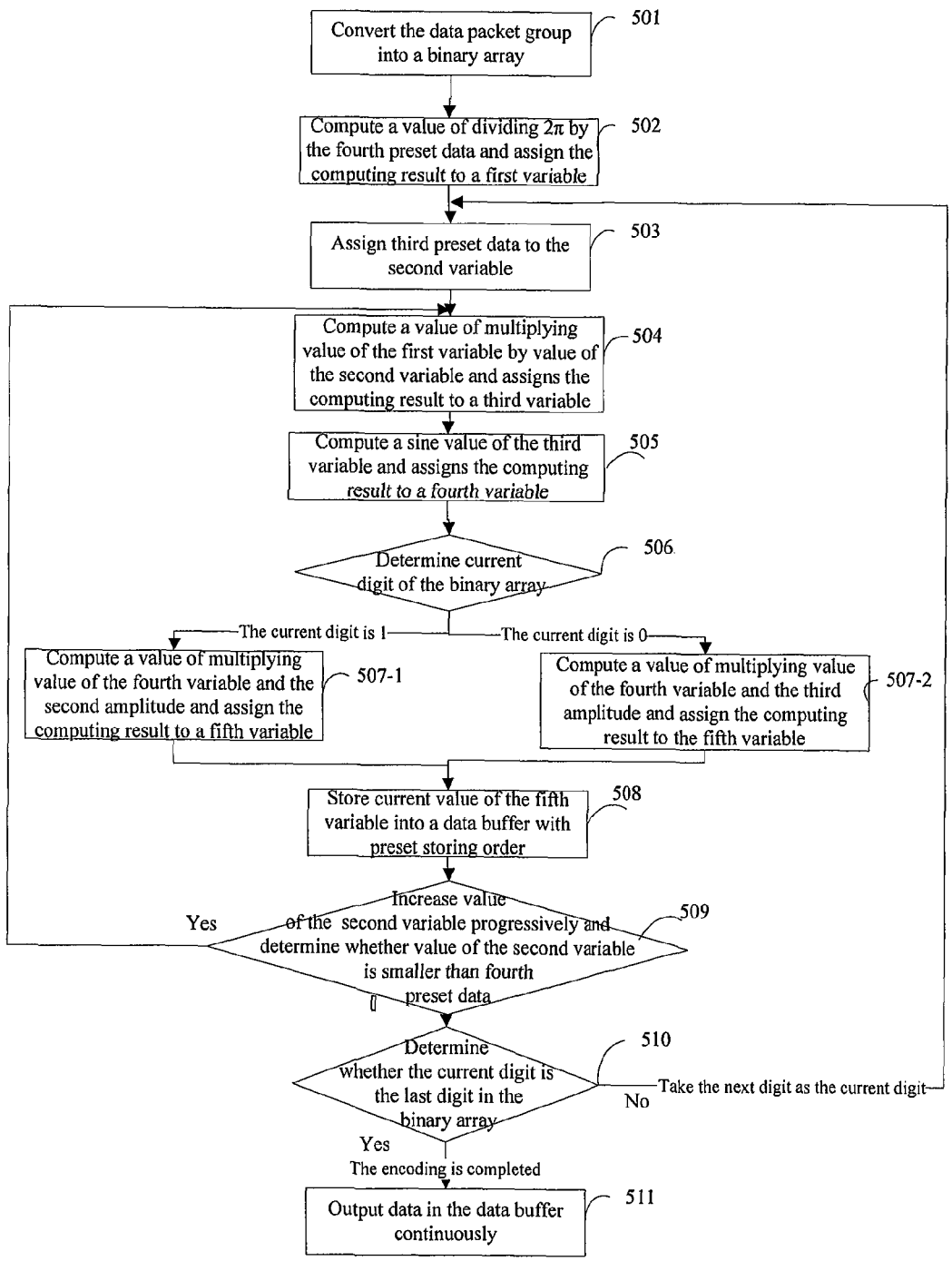
FIG. 5 is a flow chart of a method for converting a data packet group into audio data provided in Embodiment 5 of the invention.

As illustrated in FIG. 5, a method for converting the data packet group into audio data is provided in the embodiment. The method includes steps of converting the data packet group into binary data, checking for a current bit of the binary array, if the current bit of the binary array is 1, computing according to a second preset algorithm, a fourth preset data and a second preset amplitude and storing the computing result into a data buffer subsequently; if the current bit is 0, computing according to the second preset algorithm, the fourth preset data and a third preset amplitude and storing the computing result into the data buffer subsequently; determining whether the current bit is a final bit in the binary array, if yes, the encoding being completed; repeatedly outputting data in the data buffer; if no, taking the next bit as the current bit and returning to the above determining step, which includes the steps as below.

Step 501, convert the data packet group into a binary array.

Specifically, in the embodiment 5, the data packet group is one byte of data 0x31, and therefore the binary array converted from the data packet group is 00110001.

Step 502, compute a result of dividing $2\pi$ by the fourth preset data and assign the computing result to a first variable.

Specifically, the fourth preset data is set into an arbitrary value between 6 and 20, for example, the fourth preset data is set into 6 and then the computed first variable is $\pi/3$.

Step 503, assign the third preset data to a second variable.

For example, in the embodiment 5, the third preset data is 0.

Step 504, compute a product of the first variable and the second variable, and assign the computing result to a third variable.

Step 505, computing a sine value of the third variable, and assign the computing result to a fourth variable.

Step 506, determine a current bit of the binary array, if the current bit is 1, Step 507-1 is executed; if no, Step 507-2 is executed.

Specifically, in the embodiment 5, all bits in the binary array are determined subsequently.

Step 507-1, compute a product of the fourth variable and the second preset amplitude and go to Step 508.

For example, the first preset amplitude is 32767.

Step 507-2, compute a product of the fourth variable and the third preset amplitude and go to Step 508.

For example, in the embodiment 5, the second preset amplitude is 255.

Step 508, store value of the fifth variable in a data buffer according to a preset storing order.

Specifically, the preset storing order is storing subsequently.

Step 509, progressively increase value of the second variable, and determine value of the second variable is smaller than fourth preset data, if yes, return to Step 504; if no, return to Step 510.

In the embodiment 5, if the current bit is 0, after the above cycle from Step 504 to Step 509 is ended, data stored in the data buffer is respectively {0, 220, 220, 0, −220, −220}; if the current bit is 1, after the cycle from Step 504 to Step 509 is ended, data stored in the data buffer is respectively {0, 28377, 28377, 0, −28377, −28377}.

Step 510, determine whether the current bit is the final bit of the binary array, if yes, the encoding is completed and Step 511 is executed; if no, take the next bit as the current bit and go to Step 503.

Step 511, repeatedly output data in the data buffer.

For example, the data packet group is one byte of data 0x31, and the final data in the data buffer is as below.

{0, 220, 220, 0, −220, −220;
0, 220, 220, 0, −220, −220;
0, 28377, 28377, 0, −28377, −28377;
0, 28377, 28377, 0, −28377, −28377;
0, 220, 220, 0, −220, −220;
0, 220, 220, 0, −220, −220;
0, 220, 220, 0, −220, −220;
0, 28377, 28377, 0, −28377, −28377}.

Embodiment 6

Figure 6:
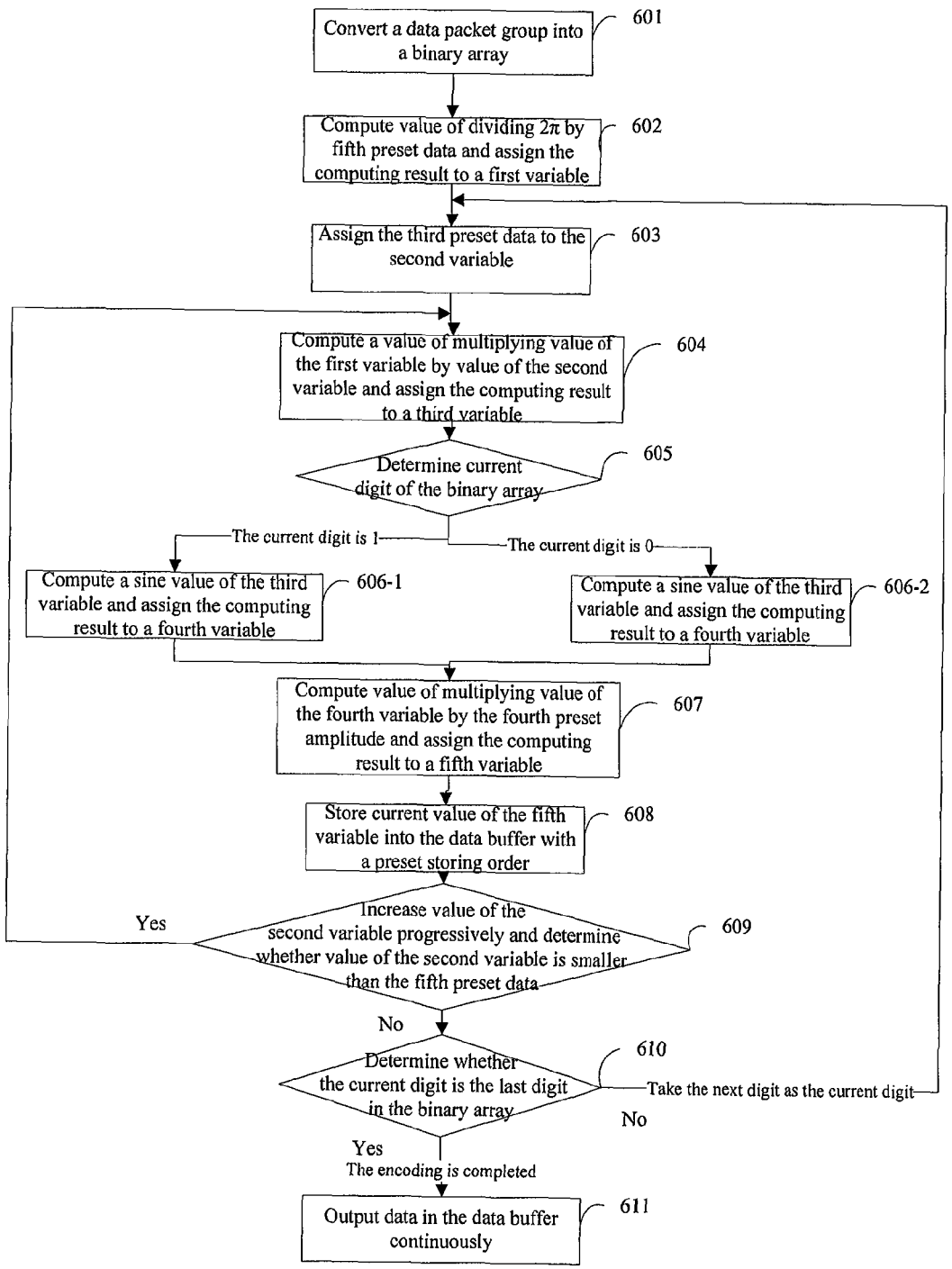
FIG. 6 is a flow chart of a method for converting a data packet group into audio data provided in Embodiment 6 of the invention.

As illustrated in FIG. 6, a method for converting the data packet group into audio data. The method includes steps of converting the data packet group into a binary array and checking for a current bit of the binary array, if the current bit is 1, computing according to a third preset algorithm, a fifth preset data and a fourth preset amplitude and storing the computing result into a data buffer subsequently, if the current bit is 0, computing according to the fourth preset algorithm, the fifth preset data and a fourth preset amplitude and storing the computing result into the data buffer subsequently; determining whether the current bit is a final bit in the binary array, if yes, the encoding being completed, and repeatedly outputting data in the data buffer; if no, taking the next bit as the current bit and returning to the above determining step, which includes the steps as below.

Step 601, convert the data packet group into a binary array.

Specifically, in the embodiment 6, the data packet group is one byte of data 0x31, and the binary array converted from the data packet group is 00110001.

Step 602, compute a value of dividing $2\pi$ by fifth preset data and assign the computing result to a first variable.

Specifically, the fifth data is commonly set into an arbitrary value between 6 and 20, and in the embodiment, the fourth preset data is 6 and the computed first variable is $\pi/3$.

Step 603, assign third preset data into a second variable.

For example, in the embodiment 6, the third preset data is 0.

Step 604, compute a product of the first variable and the second variable, and assign the computing result to a third variable.

Step 605, determine a current bit of the binary array, if the current bit is 1, go to Step 606-1; if the current bit is 0, go to Step 606-2.

Specifically in the embodiment 6, all bits in the binary array are determined subsequently.

Step 606-1, compute a cosine value of the third variable, assign the computing result to a fourth variable and go to Step 607.

Step 606-2, compute a sine value of the third variable, assign the computing result to a fourth variable and go to Step 607.

Step 607, compute a product of the fourth variable and a fourth preset amplitude and assign the computing result to a fifth variable.

Specifically, in the embodiment 6, the first preset amplitude can be 255 or 32767 and in the embodiment 6, the first preset amplitude is 32767.

Step 608, store a value of a fifth variable into a data buffer according to a preset storing order.

Specifically, in the embodiment 6, the preset storing order is storing subsequently.

Step 609, increasing value of the second variable progressively and determine whether value of the second variable is smaller than fifth preset data, if yes, go to Step 604; if no, go to Step 610.

In the embodiment 6, if the current bit is 0, after the above steps 604-609, the data stored in the data buffer is {0, 28377, 28377, 0, −28377, −28377}; if the current bit is 1, after the above steps 604-609, the data stored in the data buffer is {32767, 16383, −16383, −32767, −16383, 16383}.

Step 610, determine whether the current bit is a final bit in the binary array, if yes, the encoding is completed and Step 611 is executed; if no, take a next bit as the current bit and return to Step 603.

Step 611, repeatedly output data in the data buffer.

In the embodiment 6, the data packet group is one byte of data 0x31 and data in the final data buffer is {0, 28377, 28377, 0, −28377, −28377;
0, 28377, 28377, 0, −28377, −28377;
32767, 16383, −16383, −32767, −16383, 16383;
32767, 16383, −16383, −32767, −16383, 16383;
0, 28377, 28377, 0, −28377, −28377;
0, 28377, 28377, 0, −28377, −28377;
0, 28377, 28377, 0, −28377, −28377;
32767, 16383, −16383, −32767, −16383, 16383}.

Embodiment 7

Methods provided in Embodiments 4, 5 and 6 are computing encoding data respectively corresponding to the bit 0 and 1 instantly. In the embodiment 7, there is provided a method for converting a data packet group into audio data in which encoding data corresponding respectively to the bit 0 and 1 are computed in advance, said method comprises step as follows.

Step 701, convert the data packet group into a binary array.

Step 702, check for a current bit of the binary array, if the current bit is 1, store a first preset array into a data buffer; if the current bit is 0, store a second preset array into the data buffer.

Step 703, determine whether the current bit is a final bit in the binary array, if yes, the encoding is completed, and repeatedly output data in the data buffer according to a preset sampling frequency and a sampling size; if no, take the next bit as the current bit and return to Step 702.

Specifically, before Step 702, the method further includes computing a first preset array and a second preset array according to preset algorithm, which specifically includes steps as below.

Compute the first preset array with the first algorithm according to the first preset data and the first preset amplitude; compute a second preset array with the first algorithm according to the second preset data and the first preset amplitude; or compute the first preset array with the second preset algorithm according to the fourth preset data and the second preset amplitude, and compute the second preset array with the second preset algorithm according to the fourth preset data and the third preset amplitude; or compute the first preset array with the third preset algorithm according to the fifth preset data and the fourth preset amplitude, and compute the second preset array with the fourth preset algorithm according to the fifth preset data and the fourth preset amplitude.

Specifically, the preset algorithm, the preset data and the preset amplitude are the same as those used in Embodiments 4, 5 and 6, and therefore are not described again herein.

The above embodiments are only preferred embodiments of the invention, any change and substitution made by those skilled in the art within the scope of protection of the invention should fall below the scope of protection of the invention.

The invention claimed is:

1. A method of user authentication by an application on a OTP device, comprising:
   - Step A, a client side sending a request information message to a server upon receiving request information;
   - Step B, the server extracting and storing the request information in the request information message, generating a data packet group according to the request information, and returning the data packet group to the client side;
   - Step C, the client side converting the data packet into audio data, repeatedly broadcasting the audio data, and waiting for receiving a OTP (one time password);
   - Step D, the OTP device collecting the audio data broadcasted by the client side, encoding the audio data, so as to obtain data information, determining whether the data information is complete, if yes, generating displaying information and outputting the displaying information, if confirmation information is received within a preset time, generating a OTP according to the data information and outputting the OTP; otherwise, outputting information of prompting incomplete data information;
   - Step E, the client side sending the OTP to the server upon receiving the OTP;
   - Step F, the server generating an authentication OTP according to the request information upon receiving the OTP, and authenticating whether the OTP is valid according to the authentication OTP, if yes, the server executing an operation according to the request information; otherwise, the server sending information of prompting invalid OTP to the client side; and
   - Step G, the client side outputting corresponding prompting information upon receiving the information of prompting invalid OTP.

2. A method of user authentication by an application on a OTP device comprising:
   - Step A, a client side sending a request information message to a server upon receiving request information;
   - Step B', the server extracting and storing the request information in the request information message, generating a data packet group according to the request information, and converting the data packet group into audio data and returning the audio data to the client side;
   - Step C', the client side repeatedly broadcasting the audio data upon receiving the audio data and waiting for receiving the OTP;
   - Step D, a the OTP device collecting the audio data broadcasted by the client side, encoding the audio data, so as to obtain data information, determining whether the data information is complete, if yes, generating displaying information and outputting the displaying information, if confirmation information is received within a preset time, generating a OTP according to the data information and outputting the OTP; otherwise, outputting information of prompting incomplete data information;
   - Step E, the client side sending the OTP to the server upon receiving the OTP;
   - Step F, the server generating an authentication OTP according to the request information upon receiving the OTP, and authenticating whether the OTP is valid according to the authentication OTP, if yes, the server executing an operation according to the request information; otherwise, the server sending information of prompting invalid OTP to the client side; and
   - Step G, the client side outputting corresponding prompting information upon receiving the information of prompting invalid OTP.

3. The method of claim 1, wherein, the converting the data packet group into audio data and repeatedly broadcasting the audio data comprises
   - Step 1) converting the data packet group into a binary array;
   - Step 2) checking for a current bit of the binary array, if the current bit of the binary array is 1, storing a first preset array into a data buffer; if the current bit of the binary array is 0, storing a second preset array into the data buffer; and
   - Step 3) determining whether the current bit is a final bit of the binary array, if yes, the encoding being completed and repeatedly outputting data in the data buffer according to a preset sampling frequency and a sampling size; and otherwise, taking the next bit as the current bit and returning to Step 2).

4. The method of claim 2, wherein the converting the data packet group into audio data and repeatedly broadcasting the audio data comprises
   - Step 1) converting the data packet group into a binary array;
   - Step 2) checking for a current bit of the binary array, if the current bit of the binary array is 1, storing a first preset array into the data buffer; and if the current bit of the binary array is 0, storing a second preset array into the data buffer; and
   - Step 3) determining whether the current bit is a final bit of the binary array, if yes, the encoding being completed, and repeatedly outputting data in the data buffer according a preset sampling frequency and a sampling size; and otherwise, taking the next bit as the current bit and returning to Step 2).

5. The method of claim 1, wherein the converting the data packet group into audio data and repeatedly broadcasting the audio data comprises:
   - Step 1) converting the data packet group into a binary array;
   - Step 2) checking for a current bit of the binary array, if the current bit of the binary array is 1, computing according to first preset algorithm, a first preset data and a first preset amplitude, and storing the computing result into a data buffer subsequently; if the current bit of the binary array is 0, computing according to a first preset algorithm, a second preset data and the first preset amplitude, and storing the computing result into the data buffer subsequently; and Step 3) determining whether the current bit is a final bit of the binary array, if yes, the encoding being completed, and repeatedly outputting data in the data buffer according to a preset sampling frequency and a preset sampling size; otherwise, taking the next bit as the current bit and returning to Step 2).

6. The method of claim 2, wherein the converting the data packet group into audio data and repeatedly broadcasting the audio data comprises:

Step 1) converting the data packet into a binary array;
Step 2) checking for a current bit of the binary array, if the current bit of the binary array is 1, computing according to a first preset algorithm, a first preset data and a first preset amplitude and storing the computing result into a data buffer one by one; and if the current bit of the binary array is 0, computing according to a first preset algorithm, a second preset data and the first preset amplitude and storing the computing result into the data buffer subsequently;
Step 3) determining whether the current bit is a final bit of the binary array, if yes, the encoding being completed, and repeatedly outputting data in the data buffer according to a preset sampling frequency and a preset sampling size; otherwise, taking the next bit as the current bit and returning to Step 2).

7. The method of claim 5, wherein
the computing according to first preset algorithm, a first preset data and a first preset amplitude and storing the computing result into a data buffer subsequently comprises:

Step 1) computing a result of dividing $2\pi$ by the first preset data, assigning the computing result to a first variable, assigning a third preset data to a second variable;
Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and
Step 3) determining whether a value of the second variable is smaller than the first preset data, if the value of the second variable is smaller than the first preset data, returning to Step 2); if the value of the second variable is not smaller than the first preset data, the computing being completed; while
the computing according to a first preset algorithm, a second preset data and the first preset amplitude and storing the computing result into the data buffer subsequently comprises:

Step 1) computing a result of dividing $2\pi$ by the second preset data, assigning the computing result to a first variable, assigning the third preset data to a second variable;
Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and
Step 3) determining whether a value of the second variable is smaller than the second preset data, if yes, returning to Step 2); otherwise, the computing being completed.

8. The method of claim 6, wherein
the computing according to a first preset algorithm, a first preset data and a first preset amplitude and storing the computing result into a data buffer subsequently comprises:

Step 1) computing a result of dividing $2\pi$ by first preset data, assigning the computing result to a first variable, assigning a third preset data to a second variable;
Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and
Step 3) determining whether a value of the second variable is smaller than the first preset data, if the value of the second variable is smaller than the first preset data, returning to Step 2); if the value of the second variable is not smaller than the first preset data, the computing being completed; while
the computing according to a first preset algorithm, a second preset data and a first preset amplitude and storing the computing result into the data buffer subsequently comprises Step 1) computing a result of dividing $2\pi$ by the second preset data, assigning the computing result to a first variable, assigning a third preset data to a second variable;
Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and
Step 3) determining whether a value of the second variable is smaller than the second preset data, if yes, returning to Step 2); otherwise, the computing being completed.

9. The method of claim 1, wherein the converting the data packet into audio data and repeatedly broadcasting the audio data comprises:

Step 1) converting the data packet into a binary array;
Step 2) checking for a current bit of the binary array, if the current bit of the binary array is 1, computing according to a second preset algorithm, a fourth preset data and a second preset amplitude and storing the computing result in a data buffer subsequently; if the current bit of the binary array is 0, computing according to the second preset algorithm, the fourth preset data and a third preset amplitude and storing the computing result in the data buffer subsequently; and
Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

10. The method of claim 2, wherein the converting the data packet into audio data and repeatedly broadcasting the audio data comprises:
- Step 1) converting the data packet into a binary array;
- Step 2) checking for a current bit of the binary array, if the current bit of the binary array is 1, computing according to a second preset algorithm, a fourth preset data and a second preset amplitude and storing the computing result into a data buffer subsequently; while if the current bit of the binary array is 0, computing according to the second preset algorithm, the fourth preset data and a third preset amplitude, and storing the computing result into a data buffer subsequently; and
- Step 3) determining whether the current bit is a final bit in the binary array, if yes, the encoding being completed, and repeatedly broadcasting data in the data buffer according to a preset sampling frequency and a preset sampling size; otherwise, taking the next bit as the current bit and returning to Step 2).

11. The method of claim 9, wherein
computing according to a second preset algorithm, a fourth preset data and a second preset amplitude and storing the computing result in the data buffer subsequently comprises:
- Step 1) computing a result of dividing $2\pi$ by the fourth preset data, assigning the computing result to a first variable;
- Step 2) assigning a third preset data to a second variable;
- Step 3) computing a product of the first variable and the second variable, assigning the computing result to a third variable, computing a sine value of the third variable and assigning the computing result to a fourth variable; computing a product of the fourth variable and the second preset amplitude and assigning the computing result to a fifth variable, wherein a current value of the fifth variable is stored in the data buffer, and a value of the second variable is increased progressively;
- Step 4) determining whether a value of the second variable is smaller than the fourth preset data, if yes, returning to Step 3); otherwise, the computing being completed; while the computing according to the second preset algorithm, the fourth preset data and a third preset amplitude and storing the computing result in the data buffer subsequently comprises:
- Step 1) computing a result of dividing $2\pi$ by the fourth preset data and assigning the computing result to a first variable;
- Step 2) assigning the third preset data to a second variable;
- Step 3) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and
- Step 4) determining whether a value of the second variable is smaller than the fourth preset data, if yes, returning to Step 3); otherwise, the computing being completed.

12. The method of claim 10, wherein
the computing according to a second preset algorithm, a fourth preset data and a second preset amplitude and storing the computing result in the data buffer subsequently comprises:
- Step 1) computing a result of dividing $2\pi$ by the fourth preset data and assigning the computing result to a first variable;
- Step 2) assigning the third preset data to a second variable;
- Step 3) computing a product of the first variable and the second variable, assigning the computing result to a third variable, computing a sine value of the third variable and assigning the computing result to a fourth variable; computing a product of the fourth variable and the second preset amplitude and assigning the computing result to a fifth variable, wherein a current value of the fifth variable is stored in the data buffer, and a value of the second variable is increased progressively; and
- Step 4) determining whether a value of the second variable is smaller than the fourth preset data, if yes, returning to Step 3); otherwise, the computing being completed; while the computing according to the second preset algorithm, the fourth preset data and a third preset amplitude and storing the computing result in the data buffer subsequently comprises:
- Step 1) computing a result of dividing $2\pi$ by the fourth preset data and assigning the computing result to a first variable;
- Step 2) assigning the third preset data to a second variable;
- Step 3) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively; and
- Step 4) determining whether a value of the second variable is smaller than the fourth preset data, if yes, returning to Step 3); otherwise, the computing being completed.

13. The method of claim 1, wherein the converting the data packet into audio data and repeatedly broadcasting the audio data comprises:
- Step 1) converting the data packet into a binary array;
- Step 2) checking for a current bit of the binary array, if the current bit of the binary array is 1, computing according to a third preset algorithm, a fifth preset data and a fourth preset amplitude and storing the computing result into a data buffer subsequently; and if the current bit of the binary array is 0, computing according to the fourth preset algorithm, the fifth preset data and a fourth preset amplitude, and storing the computing result into the data buffer subsequently; and
- Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

14. The method of claim 2, wherein the converting the data packet into audio data and repeatedly broadcasting the audio data comprises:
- Step 1) converting the data packet into a binary array;
- Step 2) checking for a current bit of the binary array, if the current bit of the binary array is 1, computing according to a third preset algorithm, a fifth preset data and a fourth preset amplitude, and storing the computing result into a data buffer subsequently; and if the current bit of the binary array is 0, computing according to the fourth preset algorithm, the fifth preset data and a fourth preset amplitude, and storing the computing result into a data buffer subsequently; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

15. The method of claim 13, wherein the computing according to a third preset algorithm, a fifth preset data and a fourth preset amplitude and storing the computing result into a data buffer subsequently comprises:

Step 1) computing a result of dividing $2\pi$ by the fifth preset data, assigning the computing result to a first variable;

Step 2) assigning a third preset data to a second variable;

Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes, returning to Step 3); otherwise, the computing being completed; while the computing according to the fourth preset algorithm, the fifth preset data and a fourth preset amplitude and storing the computing result into a data buffer subsequently comprises:

Step 1) computing a result of dividing $2\pi$ by the fifth preset data, assigning the computing result to a first variable;

Step 2) assigning a third preset data to a second variable;

Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes, returning to Step 3); otherwise, the computing being completed.

16. The method of claim 14, wherein the computing according to a third preset algorithm, a fifth preset data and a fourth preset amplitude and storing the computing result in a data buffer subsequently comprises:

Step 1) computing a result of dividing $2\pi$ by the fifth preset data and assigning the computing result to a first variable;

Step 2) assigning the third preset data to a second variable;

Step 3) computing a product of the first variable and the second variable, assigning the computing result to a third variable, computing a cosine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes data, returning to Step 3); otherwise, the computing being completed; while the computing according to the fourth preset algorithm, the fifth preset data and a fourth preset amplitude and storing the computing result into a data buffer subsequently comprises:

Step 1) computing a result of dividing $2\pi$ by the fifth preset data and assigning the computing result to a first variable;

Step 2) assigning third preset data to a second variable;

Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and a value of the second variable is increased progressively; and Step 4) determining whether a value of the second variable is smaller than the fifth preset data, if yes, returning to Step 3); otherwise, the computing being completed.

17. The method of claim 1, wherein the OTP device generating a OTP according to the data information comprises that:

the OTP device generates the OTP with built-in algorithm according to the data information and a pre-stored seed; or the OTP device performs encryption operation with built-in algorithm according to the data information, a current dynamic factor and a pre-stored seed, so as to generate the OTP; wherein the dynamic factor comprises a time factor or an event factor.

18. The method of claim 2, wherein the OTP device generating a OTP according to the data information comprises that:

the OTP device generates the OTP with built-in algorithm according to the data information and a pre-stored seed; or the OTP device performs encryption operation with built-in algorithm according to the data information, a current dynamic factor and a pre-stored seed, so as to generate the OTP; wherein the dynamic factor comprises a time factor or an event factor.

19. The method of claim 17, wherein the server generating an authentication OTP with the request information comprises that:

the server generates the authentication OTP with a built-in algorithm according to the request information and a pre-stored seed; or the server performs encryption operation with a built-in algorithm according to the request information, a current dynamic factor and a pre-stored seed, so as to generate the authentication OTP; wherein the dynamic factor is a time factor or an event factor.

20. The method of claim 18, wherein the server generating an authentication OTP with the request information comprises that:

the server generates the authentication OTP with a built-in algorithm according to the request information and a pre-stored seed; or the server performs encryption operation with a built-in algorithm according to the request information, a current dynamic factor and a pre-stored seed, so as to generate the authentication OTP; wherein the dynamic factor is a time factor or an event factor.

21. The method of claim 19, wherein the authentication OTP is one OTP or a group of OTPs.

22. The method of claim 20, wherein the authentication OTP is one OTP or a group of OTPs.

23. The method of claim 21, wherein the server authenticating whether the OTP is valid according to the authentication OTP comprises:
if the authentication OTP is one OTP, determining whether the OTP is identical to the authentication OTP, if yes, the OTP being valid; otherwise, the OTP being not valid; while
if the authentication OTP is a group of OTPs, determining whether any of the authentication OTPs is identical to the OTP, if yes, the OTP being valid; otherwise, the OTP being not valid.

24. The method of claim 22, wherein the server authenticating whether the OTP is valid according to the authentication OTP comprises:
if the authentication OTP is one OTP, determining whether the OTP is identical to the authentication OTP, if yes, the OTP being valid; otherwise, the OTP being not valid; while
if the authentication OTP is one group of OTPs, determining whether any of the authentication OTPs is identical to the OTP, if yes, the OTP being valid; otherwise, the OTP being not valid.

25. A method of user authentication by an application on a OTP device, comprising:
Step a) a client side storing request information upon receiving the request information, generating a data packet group according to the request information, converting the data packet group into audio data and repeatedly broadcasting the audio data and waiting for receiving a OTP (one time password);
Step b) the OTP device collecting the audio data broadcasted by the client side, encoding the audio data to obtain data information, determining whether the data information is complete, if yes, generating displaying information and outputting the displaying information, and if confirmation information is received within a preset time, generating a OTP according to the data information and outputting the OTP; otherwise, outputting information of prompting incomplete information;
Step c) the client side sending the OTP and the request information to the server upon receiving the OTP;
Step d) the server generating an authentication OTP according to the request information upon receiving the OTP and the request information, and authenticating whether the OTP is valid according to the authentication OTP, if yes, the server executing an operation according to the request information; otherwise, sending information of prompting an invalid OTP to the client side; and
Step e) the client side outputting corresponding prompting information upon receiving the information of prompting the invalid OTP.

26. The method of claim 25, wherein the converting the data packet group into audio data and repeatedly broadcasting the audio data comprises:
Step 1) converting the data packet group into a binary array;
Step 2) checking for a current bit of the binary array, if the current bit of the binary array is 1, storing a first preset array in a data buffer; and if the current bit of the binary array is 0, storing a second preset array in the data buffer; and Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

27. The method of claim 25, wherein the converting the data packet group into audio data and repeatedly broadcasting the audio data comprises:
Step 1) converting the data packet group into a binary array;
Step 2) checking for a current bit of the binary array, if the current bit of the binary array is 1, computing according to a first preset algorithm, a first preset data and a first preset amplitude and storing the computing result into a data buffer subsequently; while if the current bit of the binary array is 0, computing according to a first preset algorithm, a second preset data and the first preset amplitude and storing the computing result into the data buffer subsequently; and
Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

28. The method of claim 27, wherein
the computing according to a first preset algorithm, a first preset data and a first preset amplitude and storing the computing result into a data buffer subsequently comprises:
Step 1) computing a result of dividing $2\pi$ by the first preset data, assigning the computing result to a first variable, assigning a third preset data to a second variable;
Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in the data buffer, and a value of the second variable is increased progressively;
Step 3) determining whether a value of the second variable is smaller than the first preset data, if yes, going to Step 2); otherwise, the computing being completed; while
the computing according to a first preset algorithm, a second preset data and a first preset amplitude and storing the computing result into a data buffer subsequently comprises:
Step 1) computing a result of dividing $2\pi$ by the second preset data, assigning the computing result to a first variable, assigning a third preset data to a second variable;
Step 2) computing a product of the first variable and the second variable, assigning the computing result to a third variable, computing a sine value of the third variable and assigning the computing result to a fourth variable; computing a product of the fourth variable and the first preset amplitude and assigning the computing result to a fifth variable, wherein a current value of the fifth variable is stored in a data buffer, and a value of the second variable is increased progressively; and
Step 3) determining whether a value of the second variable is smaller than the second preset data, if yes, going to Step 2); otherwise, the computing being completed.

29. The method of claim 25, wherein the converting the data packet group into audio data and repeatedly broadcasting the audio data comprises:
  Step 1) converting the data packet group into a binary array;
  Step 2) checking for a current bit of the binary array, if the current bit of the binary array is 1, computing according to a second preset algorithm, a fourth preset data and a second preset amplitude and storing the computing result into a data buffer subsequently; while if the current bit of the binary array is 0, computing according to a second preset algorithm, a fourth preset data and a third preset amplitude and storing the computing result into the data buffer subsequently; and
  Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

30. The method of claim 29, wherein
the computing according to a second preset algorithm, a fourth preset data and a second preset amplitude and storing the computing result into a data buffer subsequently comprises:
  Step 1) computing a result of dividing $2\pi$ by the fourth preset data, assigning the computing result to a first variable;
  Step 2) assigning a third preset data to a second variable;
  Step 3) computing a product of the first variable and the second variable, assigning the computing result to a third variable, computing a sine value of the third variable and assigning the computing result to a fourth variable; computing a product of the fourth variable and the second preset amplitude and assigning the computing result to a fifth variable, wherein a current value of the fifth variable is stored in the data buffer, and a value of the second variable is increased progressively; and
  Step 4) determining whether a value of the second variable is smaller than the fourth preset data; if yes, going to Step 3); otherwise, the computing being completed; while
computing according to a second preset algorithm, a fourth preset data and a third preset amplitude and storing the computing result in a data buffer comprises:
  Step 1) computing a result of dividing $2\pi$ by the fourth preset data and assigning the computing result to a first variable;
  Step 2) assigning a third preset data to a second variable;
  Step 3) computing a product of the first variable and the second variable, assigning the computing result to a third variable, computing a sine value of the third variable and assigning the computing result to a fourth variable; computing a product of the fourth variable and the third preset amplitude and assigning the computing result to a fifth variable, wherein a current value of the fifth variable is stored in the data buffer, and a value of the second variable is increased progressively; and
  Step 4) determining whether a value of the second variable is smaller than the fourth preset data, if yes, returning to Step 3); otherwise, the computing being completed.

31. The method of claim 25, wherein the converting the data packet group into audio data and repeatedly broadcasting the audio data comprises:
  Step 1) converting the data packet group into a binary array;
  Step 2) checking for a current bit of the binary array, if the current bit of the binary array is 1, computing according to a third preset algorithm, a fifth preset data and a fourth preset amplitude and storing the computing result into a data buffer subsequently; while if the current bit of the binary array is 0, computing according to a fourth preset algorithm, a fifth preset data and a fourth preset amplitude and storing the computing result into the data buffer subsequently; and
  Step 3) determining whether the current bit is a final bit of the binary array, if yes, the encoding being completed, and repeatedly broadcasting data in the data buffer according to a preset sampling frequency and a preset sampling size; otherwise, taking the next bit as the current bit and returning to Step 2).

32. The method of claim 31, wherein
the computing according to a third preset algorithm, a fifth preset data and a fourth preset amplitude and storing the computing result into a data buffer subsequently comprises:
  Step 1) computing a result of dividing $2\pi$ by the fifth preset data, assigning the computing result to a first variable;
  Step 2) assigning the third preset data to a second variable;
  Step 3) computing a product of the first variable and the second variable, assigning the computing result to a third variable, computing a cosine value of the third variable and assigning the computing result to a fourth variable; computing a product of the fourth variable and the fourth preset amplitude and assigning the computing result to a fifth variable, wherein a current value of the fifth variable is stored in a data buffer, and a value of the second variable is increased progressively; and
  Step 4) determining whether a value of the second variable is smaller than the fifth preset data, if yes, returning to Step 3); otherwise, ending iteration; while
the computing according to a fourth preset algorithm, a fifth preset data and a fourth preset amplitude and storing the computing result into a data buffer subsequently comprises:
  Step 1) computing a result of dividing $2\pi$ by the fifth preset data, assigning the computing result to a first variable;
  Step 2) assigning the third preset data to a second variable;
  Step 3) computing a product of the first variable and the second variable, assigning the computing result to a third variable, computing a sine value of the third variable and assigning the computing result to a fourth variable; computing a product of the fourth variable and the fourth preset amplitude and assigning the computing result to a fifth variable, wherein a current value of the fifth variable is stored in the data buffer, and the value of the second variable is increased progressively; and
  Step 4) determining whether a value of the second variable is smaller than the fifth preset data; if yes, returning to Step 3); otherwise, the computing being completed.

33. The method of claim 25, wherein the OTP device generating an OTP according to the data information comprises that
  the OTP device generates the OTP with a built-in algorithm according to the data information and a pre-stored seed; or
  the OTP device performs encryption operation with a built-in algorithm according to the data information, a current dynamic factor and a pre-stored seed, so as to generate the OTP; wherein the dynamic factor is a time factor or an event factor.

34. The method of claim 33, wherein the server generating an authentication OTP according to the request information comprises that the server generates the authentication OTP with a built-in algorithm according to the request information and a pre-stored seed; or the server performs encryption operation with the built-in algorithm according to the request information, a current dynamic factor and a pre-stored seed, so as to generate the authentication OTP; wherein the dynamic factor is a time factor or an event factor.

35. The method of claim 34, wherein the authentication OTP is one OTP or a group of OTPs.

36. The method of claim 35, wherein the server authenticating whether the OTP is valid according to the authentication OTP comprises:

if the authentication OTP is one OTP, determining whether the OTP is identical to the authentication OTP, if yes, the OTP being valid; otherwise, the OTP being not valid; or if the authentication OTP is one group of OTPs, determining whether any of the authentication OTPs is identical to the OTP, if yes, the OTP being valid; otherwise, the OTP being not valid.

\* \* \* \* \*